Patented Dec. 16, 1952

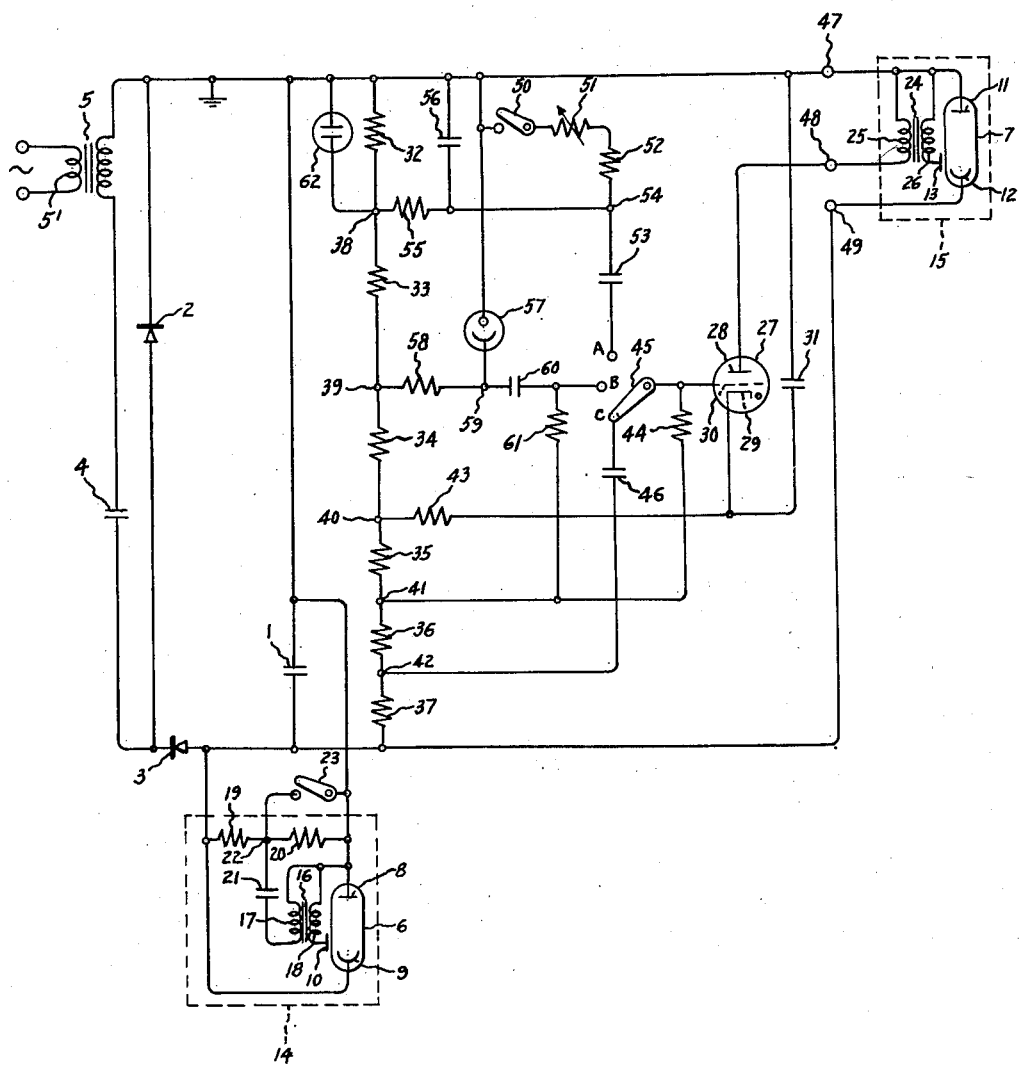
Inventor:
Harold W. Lord,
by Paul A. Frank
His Attorney.

2,622,229

UNITED STATES PATENT OFFICE 2,622,229

FLASH TUBE CIRCUIT

Harold W. Lord, Schenectady, N. Y., assignor to General Electric Company, a corporation of New York Application December 21, 1950, Serial No. 201,900

5 Claims. (Cl. 315—152)

This invention relates to improved circuits for operating a plurality of flashtubes simultaneously, and has for an object the provision of an improved circuit in which the operation of one flashtube initiates substantially simultaneous operation of one or more other flashtubes. Other objects and advantages will appear as the description proceeds.

It is known that flashes of brilliant light can be produced by suddenly discharging a capacitor through gas-filled or vapor-filled electric discharge devices, commonly called flashtubes. Usually the flashtubes have a starting electrode, of a conventional type, and the capacitor is charged to a voltage which will discharge through the flashtube only when a discharge-initiating electric impulse is applied to the starting electrode of the flashtube.

In using flashtubes with cameras for flash photography, it is often desirable to use a plurality of flashtubes, operated simultaneously, to achieve the most pleasing lighting effects. Ordinary camera shutter contacts, of the type now furnished with cameras designed for flash photography, can carry sufficient electric current to provide the initiating impulse for a single flashtube. In accordance with the present invention, an improved circuit is provided in which the operation of a first flashtube, controlled by the camera shutter contacts, supplies the discharge-initiating impulse to operate one or more other flashtubes simultaneously.

The features of this invention which are believed to be novel and patentable are pointed out in the claims which form a part of this specification. For a better understanding of the invention, reference is made in the following description to the accompanying drawing, in which the single figure is a circuit diagram of an improved flashtube circuit embodying the present invention.

Referring now to the drawing, a capacitor 1 is charged by any suitable means, such as a conventional voltage-doubler rectifier circuit comprising rectifiers 2 and 3, capacitor 4, and transformer 5. The primary winding 5' of transformer 5 is energized in the customary manner from any suitable source of alternating current.

Connected in parallel across capacitor 1 are two flashtubes 6 and 7. Each flashtube has two principal electrodes and a starting electrode, as is customary in such tubes. Flashtube 6 has an anode 8, a cathode 9 and a starting electrode 10. Flashtube 7 has an anode 11, a cathode 12 and a starting electrode 13. Each of these flashtubes, and the components immediately associated therewith inclosed by broken lines 14 and 15 respectively, may be mounted as a separate unit for disposition at any desired location about the object to be photographed.

A transformer 16 has a primary winding 17 and a secondary winding 18. Secondary winding 18 is connected between anode 8 and starting electrode 10, as shown. A voltage divider comprising resistors 19 and 20 in series is connected between anode 8 and cathode 9, as shown. A capacitor 21 is connected in series with primary winding 17 between anode 8 and tap 22 of the voltage divider. A switch 23, which may be the conventional camera shutter contacts, is connected in parallel with resistor 20 as shown. When capacitor 1 is charged, there is a voltage drop across resistor 20 which charges capacitor 21. When the camera shutter is operated, switch 23 closes, and capacitor 21 discharges through primary winding 17. This applies a discharge-initiating impulse to starting electrode 10, which initiates discharge of capacitor 1 through flashtube 6.

Transformer 24 has a primary winding 25 and a secondary winding 26. Secondary winding 26 is connected between anode 11 and starting electrode 13, as shown. An electric discharge device 27, which may be a thyratron, has an anode 28, a cathode 29 and a control electrode 30. Primary winding 25 is connected between anode 11 and anode 28. A capacitor 31 is connected between cathode 29 and an anode 11, so that winding 25, device 27 and capacitor 31 are connected in series.

A voltage divider comprising resistors 32, 33, 34, 35, 36 and 37 in series is connected across capacitor 1 as shown, so that progressively more negative voltages are provided at taps 38, 39, 40, 41 and 42. Cathode 29 is connected through resistor 43 to tap 40. Control electrode 30 is connected through resistor 44 to a more negative tap 41. When three-position switch 45 is in position C, as shown in the drawing, control electrode 30 is also connected through a capacitor 46 to the still more negative tap 42. These connections normally apply a sufficient negative bias to electrode 30 to maintain device 27 nonconductive.

When capacitor 1 begins to discharge through flashtube 6 in response to closing of switch 23, the voltage across capacitor 1 begins to decrease suddenly, and the potential at tap 42 therefore becomes less negative. This applies a relatively positive impulse to control electrode 30 through capacitor 46. By selecting proper values of resistance for resistors 32—37, this positive impulse can be made sufficiently great to overcome the negative bias normally applied to electrode 30 upon a relatively small drop in potential across capacitor 1. When this occurs, device 27 becomes conductive, and capacitor 31 discharges suddenly through device 27 and primary winding 25. This supplies an electric impulse to starting electrode 13, which initiates current flow through flashtube 7. Capacitor 1 then continues to discharge through the two flashtubes in parallel. The action occurs so rapidly, that for all practical purposes the flashtubes operate simultaneously.

If desired, other flashtubes can be connected in parallel with flashtube 7 at terminals 47, 48 and 49. In this way, several flashtubes may conveniently be operated from conventional camera shutter contacts.

With switch 45 in position A, flashtube 7 can be operated independently, with an adjustable time delay, upon closing switch 50. Switch 50 is connected through an adjustable resistor 51, a fixed resistor 52, a capacitor 53 and switch 45 to control electrode 30. The circuit junction 54 between resistor 52 and capacitor 53 is connected through resistor 55 to tap 38. A capacitor 56 is connected between circuit junction 54 and anode 11. When switch 50 is closed, capacitor 56 begins to discharge at a rate determined by the combined resistance of resistors 51 and 52. As this capacitor discharges, control electrode 30 becomes more positive, and when the negative bias normally applied to this control electrode is overcome, device 27 suddenly becomes conductive to apply a discharge-initiating impulse to starting electrode 13. Since the rate of discharge of capacitor 56 can be adjusted by varying the value of adjustable resistor 51, a time delay of desired value can be obtained.

With switch 45 in position B, flashtube 7 can be operated by light striking a phototube 57. Tube 57 is connected in series with resistor 58 between anode 11 and tap 39. The circuit junction 59 between tube 57 and resistor 58 is connected through a capacitor 60 and switch 45 to control electrode 30. Also, when switch 45 is in position B, a resistor 61 is connected in parallel with resistor 44. When light strikes phototube 57, a positive impulse is applied to control electrode 30, which initiates operation of flashtube 7. In this way, one or more flashtubes may be operated remotely by a flash of light from any other flashtube.

A neon glow lamp 62 may be connected in parallel with resistor 32, as shown. This lamp is designed to light only when capacitor 1 is charged to about 90% of its maximum voltage. Therefore, lamp 62 operates as an indicator to show that capacitor 1 is charged and that the circuit is ready to operate. Upon discharge of capacitor 1, the flashtubes become de-ionized, since the voltage-doubler power supply does not provide sufficient current to maintain current flow through the flashtubes.

Having described the principle of this invention and the best mode in which I have contemplated applying that principle, I wish it to be understood that the apparatus described is illustrative only, and that other means can be employed without departing from the true scope of the invention.

What I claim as new and desire to secure by Letters Patent of the United States is:

1. A flashtube circuit comprising first and second flashtubes each having at least two principal electrodes and a starting electrode, a capacitor connected across said first flashtube, means for charging said capacitor, means to apply an electric impulse to the starting electrode of said first flashtube to initiate discharge of said capacitor therethrough, and means responsive to the resulting decrease in voltage across said capacitor for applying an electric impulse to the starting electrode of said second flashtube.

2. A flashtube circuit comprising first and second capacitors, means for charging said capacitors, first and second flashtubes connected in parallel across said first capacitor, each of said flashtubes having at least two principal electrodes and a starting electrode and being of a type which at maximum capacitor voltage will conduct current only upon application of an electric impulse to its starting electrode, means to apply an electric impulse to the starting electrode of said first flashtube to initiate discharge of said first capacitor therethrough, a transformer having a primary winding and a secondary winding, said secondary winding being connected between the starting electrode and one of the principal electrodes of said second flashtube, an electric discharge device having at least two principal electrodes and a control electrode, said primary winding, said second capacitor and said discharge device being connected in series, means biasing said discharge device to be normally nonconductive, and means to apply an electric impulse to said control electrode responsive to a decrease in voltage across said first capacitor, thereby discharging said second capacitor through said discharge device and said primary winding, whereby a discharge-initiating electric impulse is applied to the starting electrode of said second flashtube.

3. A flashtube circuit comprising a first capacitor, first and second flashtubes connecting in parallel across said first capacitor, each of said flashtubes having an anode, a cathode and a starting electrode, means for charging said first capacitor to a potential such that the capacitor discharges suddenly through the flashtubes only upon application of electric impulses to the respective starting electrodes, thereby producing flashes of brilliant light, a first transformer having a primary winding and a secondary winding, the secondary winding of said first transformer being connected between the anode and the starting electrode of said first flashtube, a second capacitor connected in series with the primary winding of said first transformer, means to charge said second capacitor, means to discharge said second capacitor through the primary winding of said first transformer to apply a discharge-initiating electric impulse to the starting electrode of said first flashtube, a voltage divider having a plurality of taps, said voltage divider being connected across said first capacitor, a second transformer having a primary winding and a secondary winding, the secondary winding of said second transformer being connected between the anode and the starting electrode of said second flashtube, an electric discharge device having an anode, a cathode and a control electrode, the primary winding of said second transformer being connected between the anode of said second flashtube and the anode of said electric discharge device, a third capacitor connected between the anode of said second flashtube and the cathode of said electric discharge device, the cathode of said electric discharge device being connected to a tap of said voltage divider, a resistor connected between said control electrode and a more negative tap of said voltage divider, whereby said electric discharge device is biased to be normally nonconductive, and a fourth capacitor connected between said control electrode and a still more negative tap of said voltage divider, whereby the decrease in voltage across said first capacitor upon initiation of its discharge through said first flashtube applies a relatively positive impulse to said control electrode, thereby causing said third capacitor to discharge through said electric discharge device and the primary winding of said second transformer to apply a discharge-initiating impulse to the starting electrode of said second flashtube.

4. A flashtube circuit including a first and at least a second flashtube each having at least two principal electrodes and a starting electrode, a capacitor coupled across said first flashtube, means for charging said capacitor, means to apply an electric impulse to the starting electrode of said first flashtube to initiate discharge of said capacitor therethrough, a voltage dividing means coupled across said capacitor, and an electric discharge device having the input thereof coupled to said voltage dividing means and the output thereof coupled to the starting electrode of said second flashtube, said device being responsive to the resulting decrease in voltage across said voltage dividing means due to discharge of said capacitor for applying an electric impulse to the starting electrode of said second flashtube.

5. A flashtube circuit including a first and at least a second flashtube each having at least two principal electrodes and a starting electrode, a capacitor coupled across said first flashtube, means for charging said capacitor, means to apply an electric impulse to the starting electrode of said first flashtube to initiate discharge of said capacitor therethrough, voltage dividing means coupled across said capacitor, selective switching means having a movable switch arm adapted to selectively engage any one of a plurality of fixed contacts, a first one of said fixed contacts being coupled to said voltage dividing means, a photo-tube circuit coupled to a second one of said fixed contacts, an adjustable time delay circuit coupled to a third one of said fixed contacts, and an electric discharge device having the input thereof coupled to the movable switch arm of said selective switching means and the output thereof coupled to the starting electrode of said second flashtube.

HAROLD W. LORD.

REFERENCES CITED

The following references are of record in the file of this patent:

UNITED STATES PATENTS

| Number | Name | Date |
| --- | --- | --- |
| 2,509,005 | Lord | May 23, 1950 |